United States Patent
Kamble et al.

(10) Patent No.: US 9,008,085 B2
(45) Date of Patent: Apr. 14, 2015

(54) NETWORK INTERFACE CARD HAVING OVERLAY GATEWAY FUNCTIONALITY

(75) Inventors: Keshav G. Kamble, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/586,792

(22) Filed: Aug. 15, 2012

(65) Prior Publication Data

US 2014/0050218 A1 Feb. 20, 2014

(51) Int. Cl.
*H04L 12/28* (2006.01)
*H04L 12/54* (2013.01)
*H04L 12/935* (2013.01)
*H04L 12/26* (2006.01)

(52) U.S. Cl.
CPC .................................. *H04L 12/2626* (2013.01)

(58) Field of Classification Search
USPC ............ 370/386, 389, 395.53, 401, 412, 419, 370/469, 492; 709/223, 226, 232, 238, 249, 709/250
See application file for complete search history.

(56) References Cited

U.S. PATENT DOCUMENTS

| | | | |
|---|---|---|---|
| 7,983,257 B2 | 7/2011 | Chavan et al. | |
| 8,166,205 B2 | 4/2012 | Farinacci et al. | |
| 8,351,448 B1* | 1/2013 | McGlaughlin | 370/419 |
| 2006/0251072 A1* | 11/2006 | Hendel et al. | 370/392 |
| 2010/0014526 A1* | 1/2010 | Chavan et al. | 370/395.53 |
| 2010/0054260 A1 | 3/2010 | Pandey et al. | |
| 2010/0082874 A1 | 4/2010 | Baba et al. | |
| 2010/0115174 A1* | 5/2010 | Akyol et al. | 710/316 |
| 2010/0232443 A1 | 9/2010 | Pandey | |
| 2011/0022695 A1 | 1/2011 | Dalal et al. | |
| 2011/0075664 A1 | 3/2011 | Lambeth et al. | |

(Continued)

FOREIGN PATENT DOCUMENTS

| | | |
|---|---|---|
| JP | 2010079816 | 4/2010 |
| WO | WO2010123143 | 10/2010 |
| WO | WO2011090145 | 7/2011 |

OTHER PUBLICATIONS

Mahalingam et al., "VXLAN: A Framework for Overlaying Virtualized Layer 2 Networks over Layer 3 Networks," Network Working Group, Feb. 24, 2012, pp. 1-20.

(Continued)

*Primary Examiner* — Ahmed Elallam
(74) *Attorney, Agent, or Firm* — Zilka-Kotab, PC

(57) ABSTRACT

In one embodiment, a system includes a network interface card (NIC) having a plurality of network ports including multiple Peripheral Component Interconnect express (PCIe) ports, a multi-lane PCIe interface adapted for communicating with a server, an Ethernet controller adapted for communicating with a network, and logic adapted for providing overlay network gateway functionality. In another embodiment, a NIC includes a plurality of network ports including multiple PCIe ports, a multi-lane PCIe interface adapted for communicating with a server, an Ethernet controller adapted for communicating with a network, and logic adapted for providing overlay network gateway functionality to traffic that passes through the NIC. In yet another embodiment, a method for providing overlay network gateway functionality in a network includes providing overlay network gateway functionality for network traffic received by a NIC implemented in a server, wherein the NIC provides an interface between a server and a network.

25 Claims, 10 Drawing Sheets

(56) References Cited

U.S. PATENT DOCUMENTS

| | | | |
|---|---|---|---|
| 2011/0131581 A1* | 6/2011 | Auernhammer et al. | 718/102 |
| 2011/0134931 A1* | 6/2011 | Merwe et al. | 370/401 |
| 2012/0008528 A1 | 1/2012 | Dunbar et al. | |
| 2012/0030380 A1 | 2/2012 | Yanagimachi | |
| 2012/0042095 A1* | 2/2012 | Kotha et al. | 709/233 |
| 2012/0183001 A1 | 7/2012 | Suzuki et al. | |
| 2012/0250686 A1* | 10/2012 | Vincent et al. | 370/392 |
| 2013/0042019 A1* | 2/2013 | Galles et al. | 709/232 |
| 2013/0044631 A1* | 2/2013 | Biswas et al. | 370/254 |
| 2013/0124750 A1* | 5/2013 | Anumala et al. | 709/232 |
| 2013/0170490 A1* | 7/2013 | Kreeger et al. | 370/390 |
| 2013/0254359 A1* | 9/2013 | Boutros et al. | 709/223 |
| 2013/0297768 A1* | 11/2013 | Singh | 709/224 |
| 2013/0304917 A1* | 11/2013 | Mittal et al. | 709/225 |
| 2013/0318219 A1* | 11/2013 | Kancherla | 709/222 |
| 2013/0346531 A1* | 12/2013 | Hummel et al. | 709/212 |

OTHER PUBLICATIONS

International Search Report and Written Opinion from PCT Application No. PCT/IB2013/056146 dated Jan. 21, 2014.

* cited by examiner

NETWORK INTERFACE CARD HAVING OVERLAY GATEWAY FUNCTIONALITY

BACKGROUND

The present invention relates to data center infrastructure, and more particularly, this invention relates to processing overlay traffic on network interface cards which are capable of bridging overlay and non-overlay networks.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an internet protocol (IP)-based network. The overlay header includes an identifier (ID) that uniquely identifies the virtual network. The target switch (tunnel end point) strips off the overlay header encapsulation, UDP transport header, and IP header, and delivers the original packet to the destination end station via conventional network connections. In addition to this tunneling mechanism, the edge switches participate in an address discovery protocol, which may be learning/flooding based, or lookup-based.

Overlay networks like Virtual eXtensible Local Area Network (VXLAN) connect geographically separated Layer-2 (L2) networks using tunnels. These are L2 over Layer-3 (L3) tunnels. L2 packets originated by a virtual machine (VM) in a VXLAN and destined to another VM or group of VMs in same VXLAN in another physical location are carried over L3 tunnels.

An overlay network may be implemented using a number of VMs with a virtualization platform controlling the processing of networking packets in and out of each VM and one or more VMs may be associated with the overlay network. A virtualization platform processes the networking traffic associated with each overlay network and/or VM using predefined properties and policies for the corresponding overlay network and/or VM. As the number of overlay networks increases, so does the processing load requirements of the virtualization platform. The processing load requirements of the virtualization platform include a number of tunnels terminated, management of Virtual Tunnel End Points (VTEPs), address learning per tunnel, packet encapsulation and de-capsulation per tunnel, etc. Therefore, for a given performance level of a network, the number of overlay networks or VMs is limited by the virtualization platform's processing capabilities. Therefore, there is a need to increase the performance of a virtualization platform without increasing the physical resources available that are used by the virtualization platform in order to continue to expand the use of overlay networks.

Another issue with overlay networks is attempting to provide support for each virtualization platform's specific implementation requirements. Each virtualization platform, e.g., VMware's Hypervisor, Microsoft's Hyper-V, KVM, etc., requires separate implementation for the overlay network. One problem with current approaches of embedding overlay network mechanisms into virtualization platforms is that issues with performance are created and different standards are necessitated for different virtualization platforms. It also complicates the functionality of overlay networks and adds barriers to interoperability between network virtualization domains on various virtualization platforms.

SUMMARY

In one embodiment, a system includes a network interface card (NIC) having a plurality of network ports including multiple Peripheral Component Interconnect express (PCIe) ports, a multi-lane PCIe interface adapted for communicating with a server, an Ethernet controller adapted for communicating with a network, and logic adapted for providing overlay network gateway functionality.

In another embodiment, a NIC includes a plurality of network ports including multiple PCIe ports, a multi-lane PCIe interface adapted for communicating with a server, an Ethernet controller adapted for communicating with a network, and logic adapted for providing overlay network gateway functionality to traffic that passes through the NIC.

In yet another embodiment, a method for providing overlay network gateway functionality in a network includes providing overlay network gateway functionality for network traffic received by a NIC implemented in a server, wherein the NIC provides an interface between a server and a network.

According to yet another embodiment, a computer program product for providing overlay network gateway functionality in a network includes a computer readable storage medium having computer readable program code embodied therewith, the computer readable program code including computer readable program code configured for enabling specific overlay network gateway functionality in a NIC implemented in a server that is providing overlay network gateway functionality for network traffic that passes through the server, and computer readable program code configured for managing operations of the NIC, wherein the specific overlay network gateway functionality is limited to operations for traffic that is received or sent through the NIC.

In another embodiment, a server includes a virtualization platform providing one or more virtual machines (VMs), the virtualization platform including: logic adapted for providing support for the one or more VMs; and logic adapted for providing a virtual switch, the virtual switch being adapted for providing switching functionality across a network to network traffic received from and/or sent to the one or more VMs, a NIC having: a plurality of network ports including multiple PCIe ports; a multi-lane PCIe interface adapted for communicating with the server; an Ethernet controller adapted for communicating with a network; logic adapted for providing overlay network gateway functionality to network traffic received from and/or sent to the network; and logic adapted for providing overlay network functionality to network traffic received from and/or sent to the one or more VMs, and a NIC driver adapted for interfacing with and supporting the NIC.

Other aspects and embodiments of the present invention will become apparent from the following detailed description, which, when taken in conjunction with the drawings, illustrate by way of example the principles of the invention.

DETAILED DESCRIPTION

Figure 1:
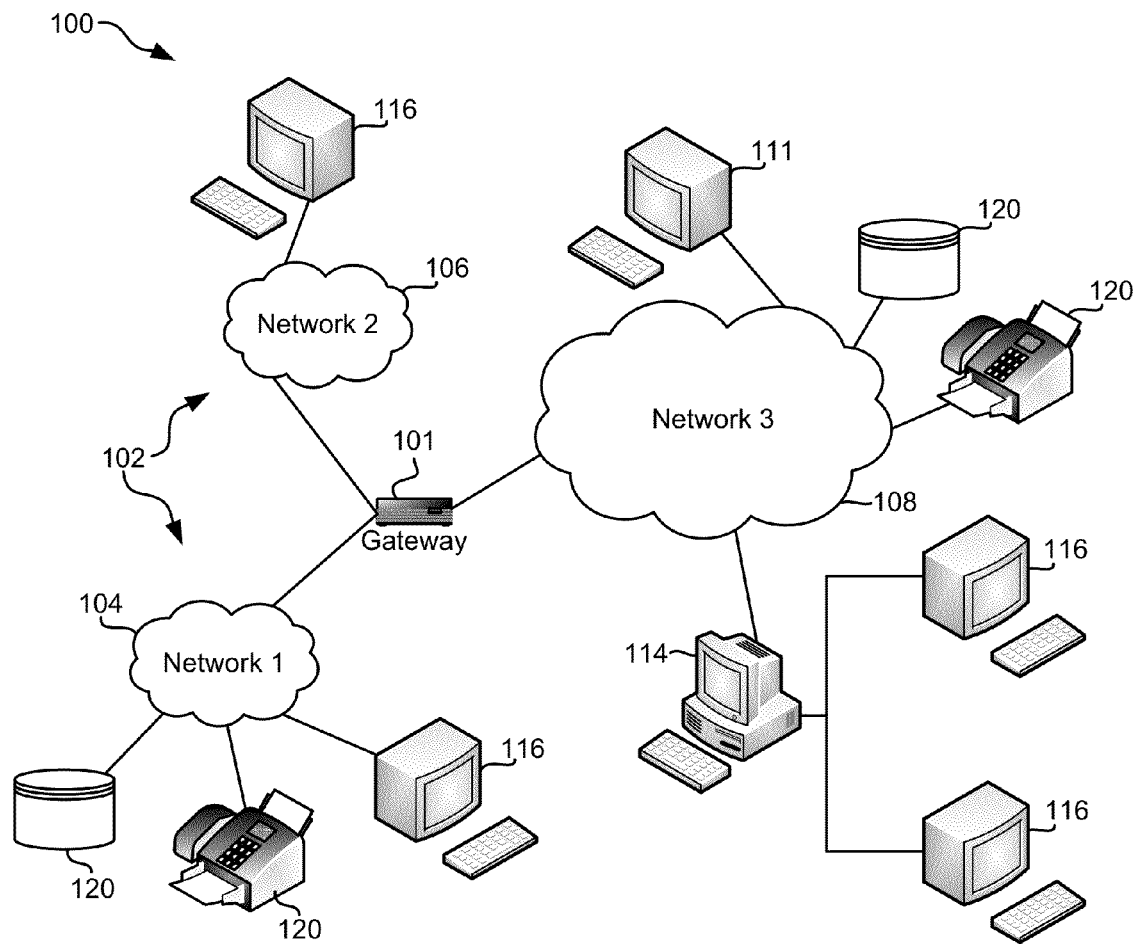
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

Implementing overlay network gateway functionality on a network interface card (NIC), according to various embodiments, allows for overlay networks to be used without complex and costly standalone overlay gateway devices installed in the network. Instead, with just the addition of NICs having overlay network gateway functionality into servers in the network, overlay network functionality may be implemented in the network seamlessly and more cost-effectively.

In one general embodiment, a system includes a NIC, having a plurality of network ports including multiple Peripheral Component Interconnect express (PCIe) ports, a multi-lane PCIe interface adapted for communicating with a server, an Ethernet controller adapted for communicating with a network, and logic adapted for providing overlay network gateway functionality.

In another general embodiment, a NIC includes a plurality of network ports including multiple PCIe ports, a multi-lane PCIe interface adapted for communicating with a server, an Ethernet controller adapted for communicating with a network, and logic adapted for providing overlay network gateway functionality to traffic that passes through the NIC.

In yet another general embodiment, a method for providing overlay network gateway functionality in a network includes providing overlay network gateway functionality for network traffic received by a NIC implemented in a server, wherein the NIC provides an interface between a server and a network.

According to yet another general embodiment, a computer program product for providing overlay network gateway functionality in a network includes a computer readable storage medium having computer readable program code embodied therewith, the computer readable program code including computer readable program code configured for enabling specific overlay network gateway functionality in a NIC implemented in a server that is providing overlay network gateway functionality for network traffic that passes through the server, and computer readable program code configured for managing operations of the NIC, wherein the specific overlay network gateway functionality is limited to operations for traffic that is received or sent through the NIC.

In another general embodiment, a server includes a virtualization platform providing one or more virtual machines (VMs), the virtualization platform including: logic adapted for providing support for the one or more VMs; and logic adapted for providing a virtual switch, the virtual switch being adapted for providing switching functionality across a network to network traffic received from and/or sent to the one or more VMs, a NIC having: a plurality of network ports including multiple PCIe ports; a multi-lane PCIe interface adapted for communicating with the server; an Ethernet controller adapted for communicating with a network; logic adapted for providing overlay network gateway functionality to network traffic received from and/or sent to the network; and logic adapted for providing overlay network functionality to network traffic received from and/or sent to the one or more VMs, and a NIC driver adapted for interfacing with and supporting the NIC.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX system which virtually hosts a MICROSOFT® WINDOWS® environment, a MICROSOFT WINDOWS system which emulates an IBM z/OS environment, etc. This virtualization and/or emulation may be enhanced through the use of VMWARE® software, in some embodiments. IBM and z/OS are trademarks of International Business Machines Corporation in the United States and other countries. UNIX is a registered trademark of The Open Group in the United States and other countries. Microsoft and Windows are trademarks of Microsoft Corporation in the United States, other countries, or both.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
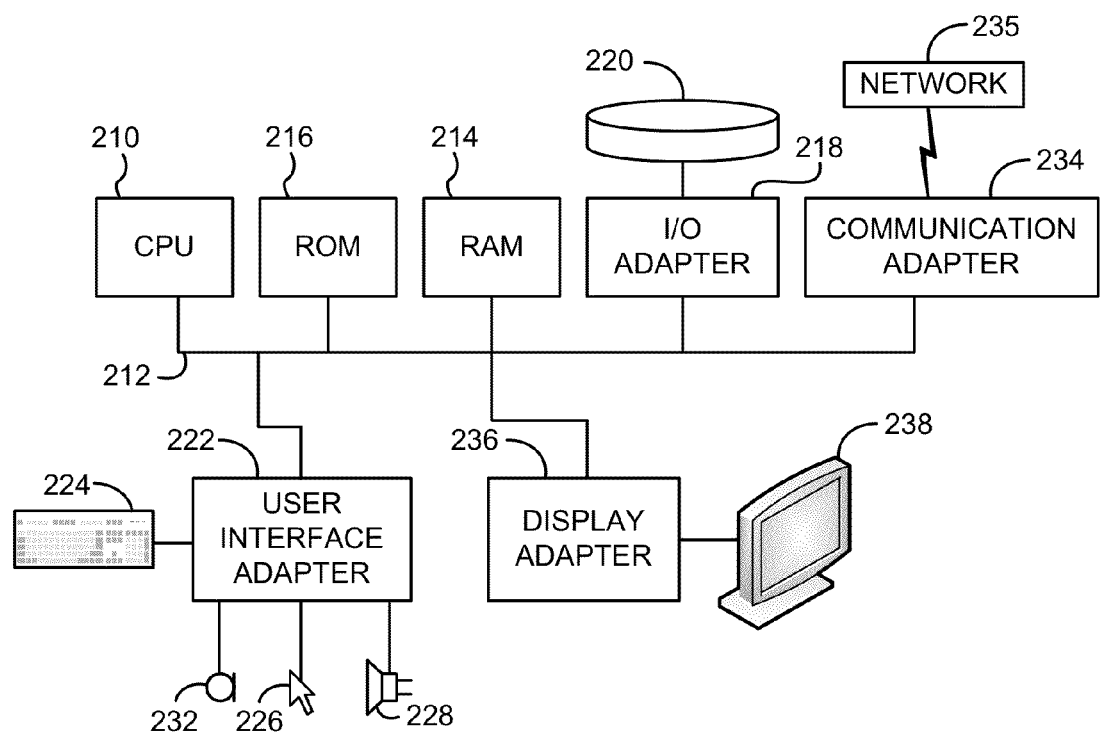
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC® OS, a UNIX OS, etc. It will be appreciated that a preferred embodiment may also be implemented on platforms and operating systems other than those mentioned. A preferred embodiment may be written using JAVA®, XML, C, and/or C++ language, or other programming languages, along with an object oriented programming methodology. Object oriented programming (OOP), which has become increasingly used to develop complex applications, may be used. MAC is a registered trademark of Apple Inc. Oracle and JAVA are registered trademarks of Oracle and/or its affiliates. Other names may be trademarks of their respective owners.

Figure 3:
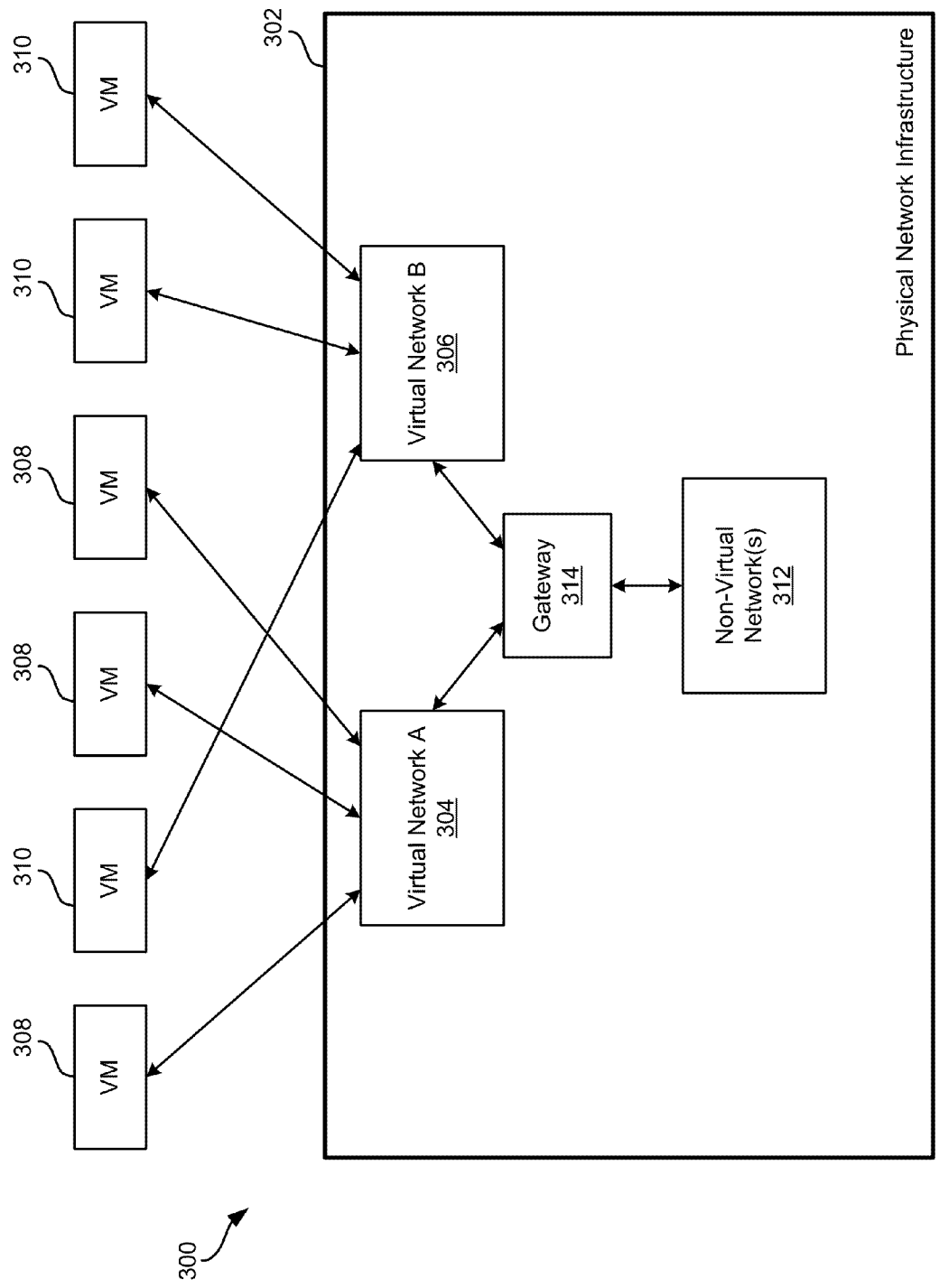
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

Components of an overlay network 300 typically define VM server groupings based on a virtual network identifier, referred to as a VNI or VNID. This is typically a 24-bit code or number, which excludes 0x0 and 0xFFFFFF. The overlay network 300 has the capability of tunneling Layer-2 (L2) packets over the Layer-3 (L3) network by encapsulating the L2 packets into an overlay header also referred to as an overlay tunnel. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, virtualization platforms, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

Figure 4A:
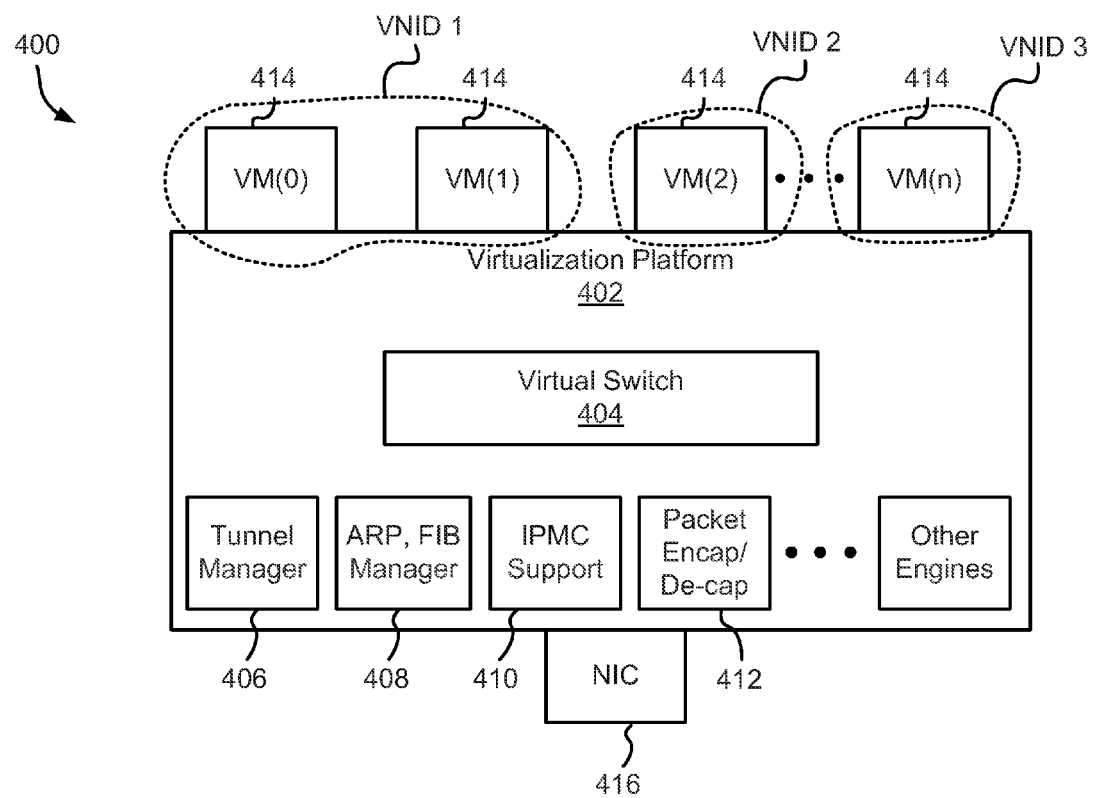
FIG. 4A shows an overlay-capable server, according to the prior art.

With reference to FIG. 4A, a server 400 is shown according to the prior art. As shown, the server 400 includes a virtualization platform 402 which provides and manages a virtual switch 404. To provide overlay functionality to the server 400, the virtualization platform 402 also interacts with a plurality of discrete software engines, such as a tunnel manager 406, an ARP and forwarding information base (FIB) manager 408, an engine for providing internet protocol multicast (IPMC) support 410, a packet encapsulation and de-capsulation engine 412, and any other overlay-enhancing software engines as known in the art. The virtualization platform 402 also provides support for any number of VMs 414, shown in FIG. 4A as VM 0, VM 1, VM 2, . . . , VM n. The VMs 414 may be arranged in one or more virtual networks (each virtual network may have a different virtual network identifier (VNID). The number and arrangement of the VMs 414 in the exemplary virtual networks is not meant to be limiting on what configurations are possible, as the Figures only show exemplary arrangements of VMs 414 and virtual networks.

Figure 4B:
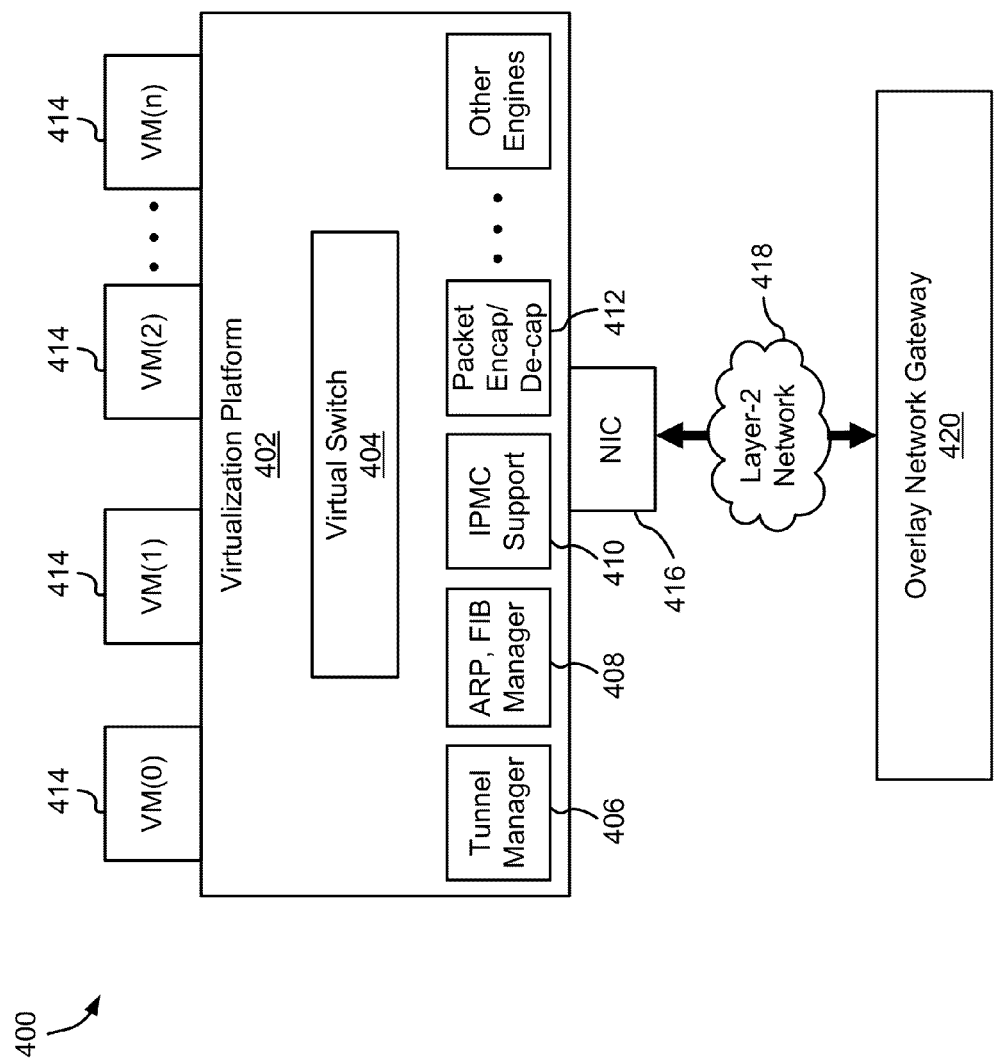
FIG. 4B shows an overlay-capable server connected to an overlay network gateway, according to the prior art.

In addition, as shown in FIG. 4B according to the prior art, the server 400 includes a physical NIC 416 which manages and provides for communications between a network 418 and the server 400, in one approach. The NIC 416 includes one or more networking ports adapted for communicating with the network 418 and the server 400. When a packet is encapsulated in an overlay header by the packet encap/de-cap engine 412, the NIC 416 simply passes the packet through to a destination specified in an outer header of the overlay-encapsulated packet.

In order to bridge between virtualized and non-virtualized networks, the packet may be delivered to an overlay network gateway 420, for further forwarding and/or routing outside of the virtual network in which the server 400 is located.

However, as shown in FIGS. 4A-4B, when the server 400 running the virtualization platform 402 is single rooted I/O virtualization (SRIOV) and/or multi-rooted I/O virtualization (MRIOV) compliant, overlay tunneling is not supported, since the NIC 416 does not have visibility to inner packets of any overlay-encapsulated packets that it passes directly to the appropriate VMs 414. Accordingly, since packets are passed directly from the NIC 416 to the VMs 414, the virtualization platform, which is supporting overlay functionality with the various engines 406, 408, 410, 412, etc. Accordingly, in order to alleviate this issue associated with MRIOV and SRIOV, a NIC capable of overlay functionality may be implemented, and is referred to herein as an accelerated NIC.

Figure 5:
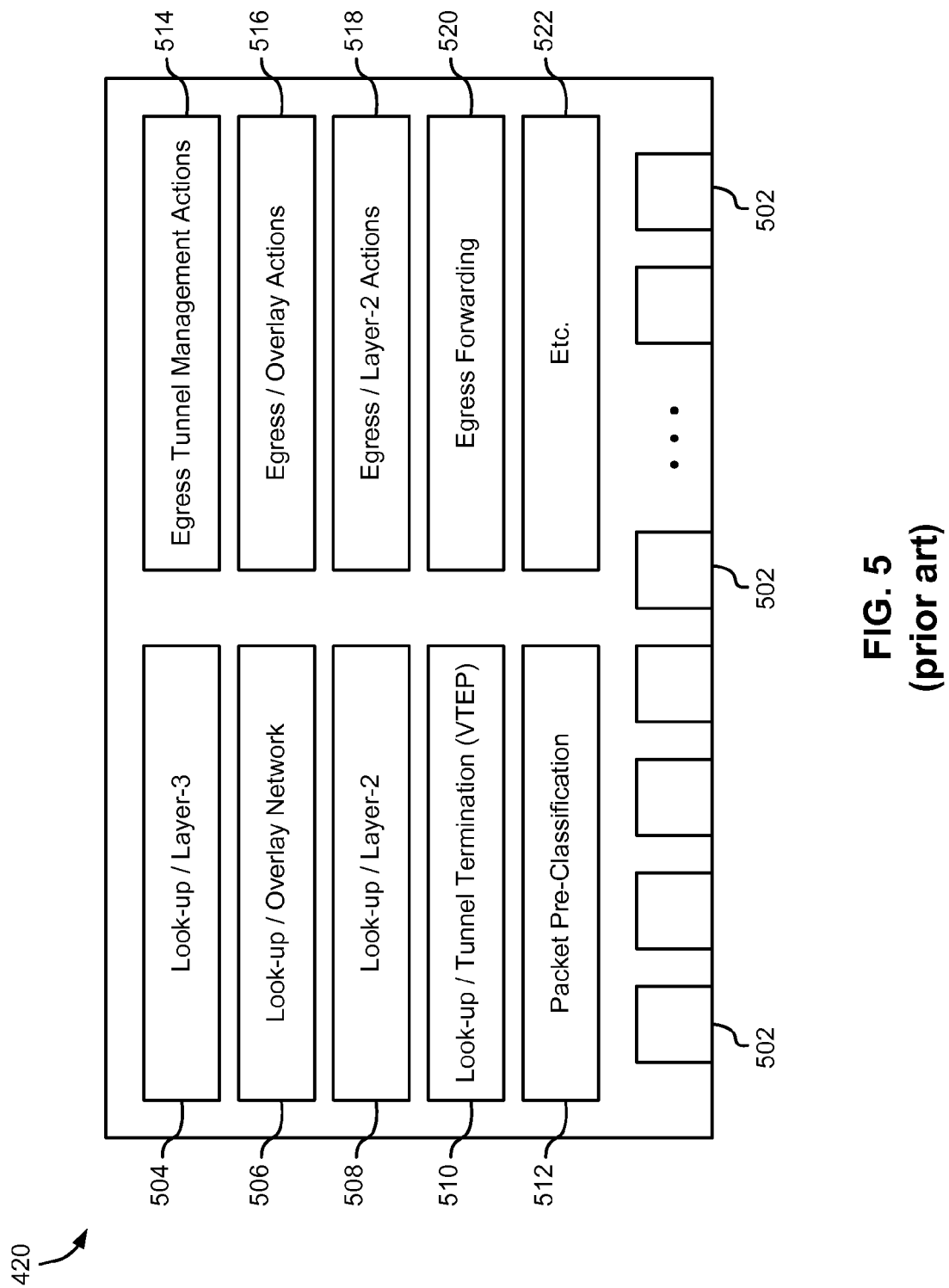
FIG. 5 shows a detailed view of an overlay network gateway, according to the prior art.

Referring now to FIG. 5, a detailed view of an overlay network gateway 420 is shown according to the prior art. The overlay network gateway 420 comprises a plurality of ports 502 which may be used for packet ingress and/or packet egress. Any number of ports 502 may be present, depending on the arrangement and capabilities of the overlay network gateway 420, such as 16 ports, 32 ports, 64 ports, 128 ports, etc. The overlay network gateway 420 also comprises logic adapted for performing look-ups for L3 addresses and devices 504, logic adapted for performing look-ups for overlay addresses and devices 506, logic adapted for performing look-ups for L2 addresses and devices 508, logic adapted for performing look-ups for tunnel addresses and devices 510, logic adapted for performing packet pre-classification 512, logic adapted for performing egress tunnel management actions 514, such as virtual tunnel end point (VTEP) management, logic adapted for performing egress overlay actions 516, logic adapted for performing egress L2 actions 518, logic adapted for performing egress forwarding actions 520, along with possibly other packet functionality 522.

According to one embodiment, some additional logic may include logic adapted for interacting with the virtualization platform and the virtual switch and/or logic adapted for providing I/O virtualization, such as SRIOV and/or MRIOV.

Any or all of this logic may be implemented in hardware or software, or a combination thereof. For example, separate modules for each distinct logic block may be implemented in one or more processors, in one embodiment. The processor(s) may include, but are not limited to, an application specific integrated circuit (ASIC), a field programmable gate array (FPGA), a central processing unit (CPU), a microcontroller (MC), a microprocessor, or some other processor known in the art.

In order to increase performance of a virtual networking server using a virtualization platform, overlay network traffic processing may be provided by utilizing a NIC having overlay gateway functionality. Specifically, the NIC having overlay gateway functionality may be adapted for providing some or all functionality of an overlay network gateway, such as managing VTEPs, address resolution protocol (ARP) cache handling, ARP learning, packet encapsulation and de-capsulation for each overlay network, various look-up functionality for L2, L3, and/or overlay networks, egress packet processing and forwarding, etc. This overlay network gateway functionality may be processed exclusively via the NIC or in combination with other overlay devices, possibly using separate modules and/or processors, and the processed traffic may be delivered to the virtualization platform for final delivery to the appropriate VM(s) or the traffic may be sent down to the network for delivery to a destination VTEP or another IP-based address.

According to one embodiment, the network may not comprise any elements capable of providing overlay network gateway functionality (or overlay functionality) and the virtualization platform may not provide overlay functionality to the network traffic received from and/or sent to the server. In this case, the NIC is relied upon to provide all overlay functionality. Of course, in other embodiments, there may be some combination of the NIC and other elements which are providing overlay functionality, such as an overlay gateway, a virtualization platform, etc.

Figure 6:
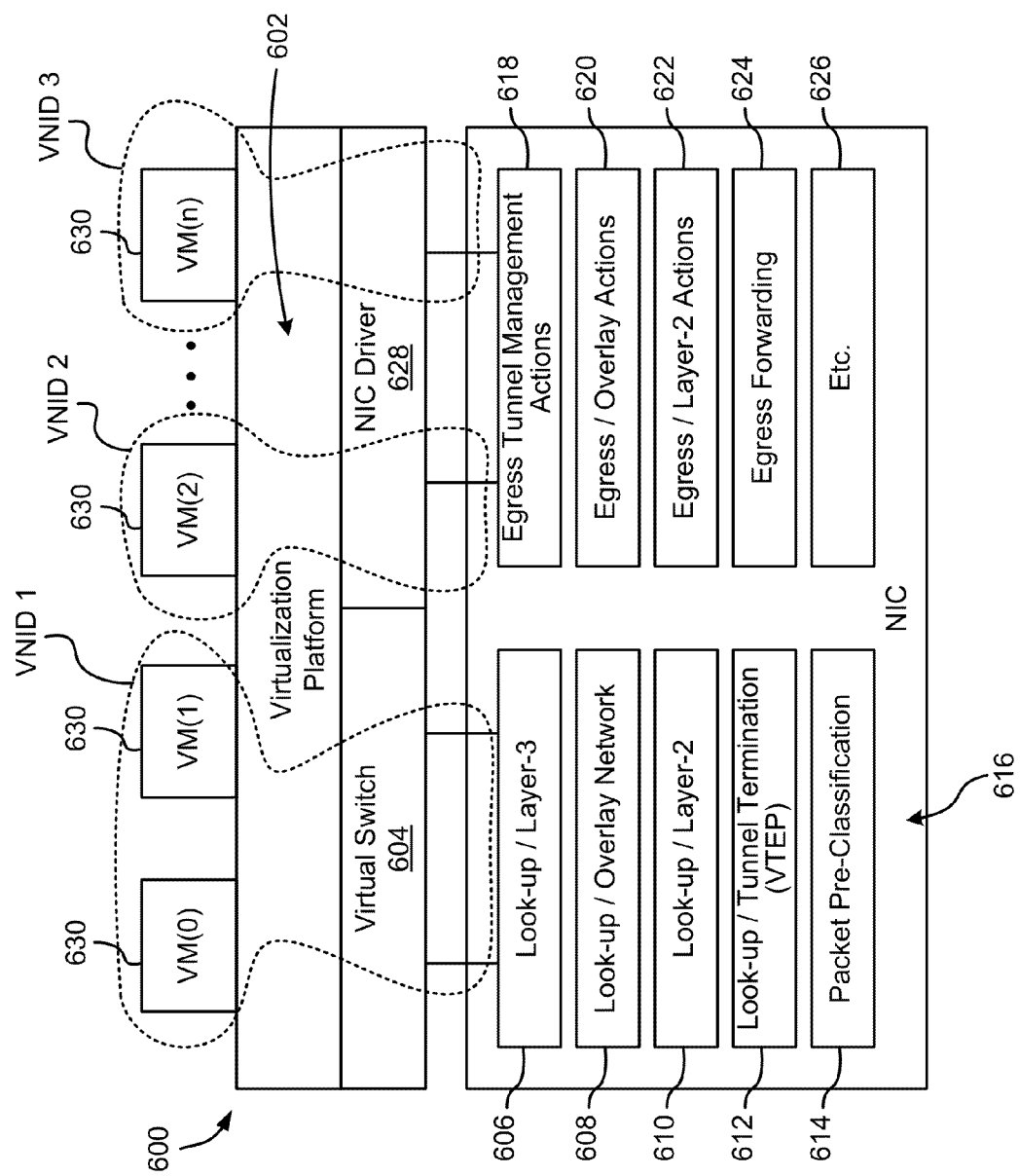
FIG. 6 shows an overlay-capable server using a network interface card (NIC) having overlay gateway functionality, according to one embodiment.

Now referring to FIG. 6, a server 600 using a NIC 616 having overlay network gateway functionality is shown according to one embodiment. The server 600 also comprises a virtualization platform 602 which provides and manages a virtual switch 604. The virtualization platform 602 also provides support for any number of virtual machines (VMs) 630, shown in FIG. 6 as VM 0, VM 1, VM 2, . . . , VM n. The VMs 630 may be arranged in one or more virtual networks (each virtual network may have a different virtual network identifier (VNID), indicated as VNID 1, VNID 2, VNID 3, etc., in FIG. 6). The number and arrangement of the VMs 630 in the exemplary virtual networks is not meant to be limiting on what configurations are possible, as the Figures only show exemplary arrangements of VMs 630 and virtual networks.

The NIC 616 makes use of one or more processors in order to provide overlay network gateway functionality, such that all overlay network gateway functionality may be offloaded onto the NIC 616, in one embodiment. This overlay network gateway functionality may be embedded as modules within the NIC 616, and may include, but is not limited to, performing look-ups for L3 addresses and devices 606, performing look-ups for overlay addresses and devices 608, performing look-ups for L2 addresses and devices 610, performing look-ups for tunnel addresses and devices 612, performing packet pre-classification 614, performing egress tunnel management actions (e.g., VTEP) 618, performing egress overlay actions 620, performing egress L2 actions 622, performing egress forwarding actions 624, along with possibly other packet functionality 626, as well as any other overlay network gateway functionality known in the art.

According to some embodiments, the egress tunnel management actions module 618 may be adapted for providing VTEP origination and termination operations, the various look-up modules 606, 608, 610, and 612 may be adapted for providing look-up operations for packets having an unknown address and forwarding information for packets having a known address, the various egress modules 618, 620, 622, and 624 may be adapted for handling the forwarding and/or sending operations for packets.

In order to provide an interface between the NIC 616 and the virtualization platform 602 in the server 600, a NIC driver 628 may be provided in the server 600 which understands and supports the overlay network gateway functionality that has been provided by the NIC 616, and may manage the NIC 616 accordingly.

In this way, according to one embodiment, in order to adapt a server 600 for use with a different overlay protocol, a NIC driver 628 capable of interfacing with the overlay network protocol supported by an installed NIC 616 having overlay network gateway functionality may be implemented in the server 600. In one non-limiting example, if a server is capable of VXLAN overlay functionality, and this server is to be used in an environment using Microsoft's Hyper-V, an accelerated NIC capable of Hyper-V may be installed in the server, and a NIC driver supporting Hyper-V may be implemented in the server, thereby rendering the server capable of operating in an overlay environment which utilizes Hyper-V as the overlay protocol. One of skill in the art would recognize that this procedure may be used regardless of the overlay protocol.

In one embodiment, if the server 600 already has a NIC driver 628 installed that is capable of supporting a certain overlay protocol, and a NIC 616 having overlay network gateway functionality capable of providing the certain overlay protocol is installed in the server 600, then the NIC 616 may simply be inserted into an available PCIe slot of the server 600, and may operate once installed, in a plug-and-play type arrangement.

Figure 7:
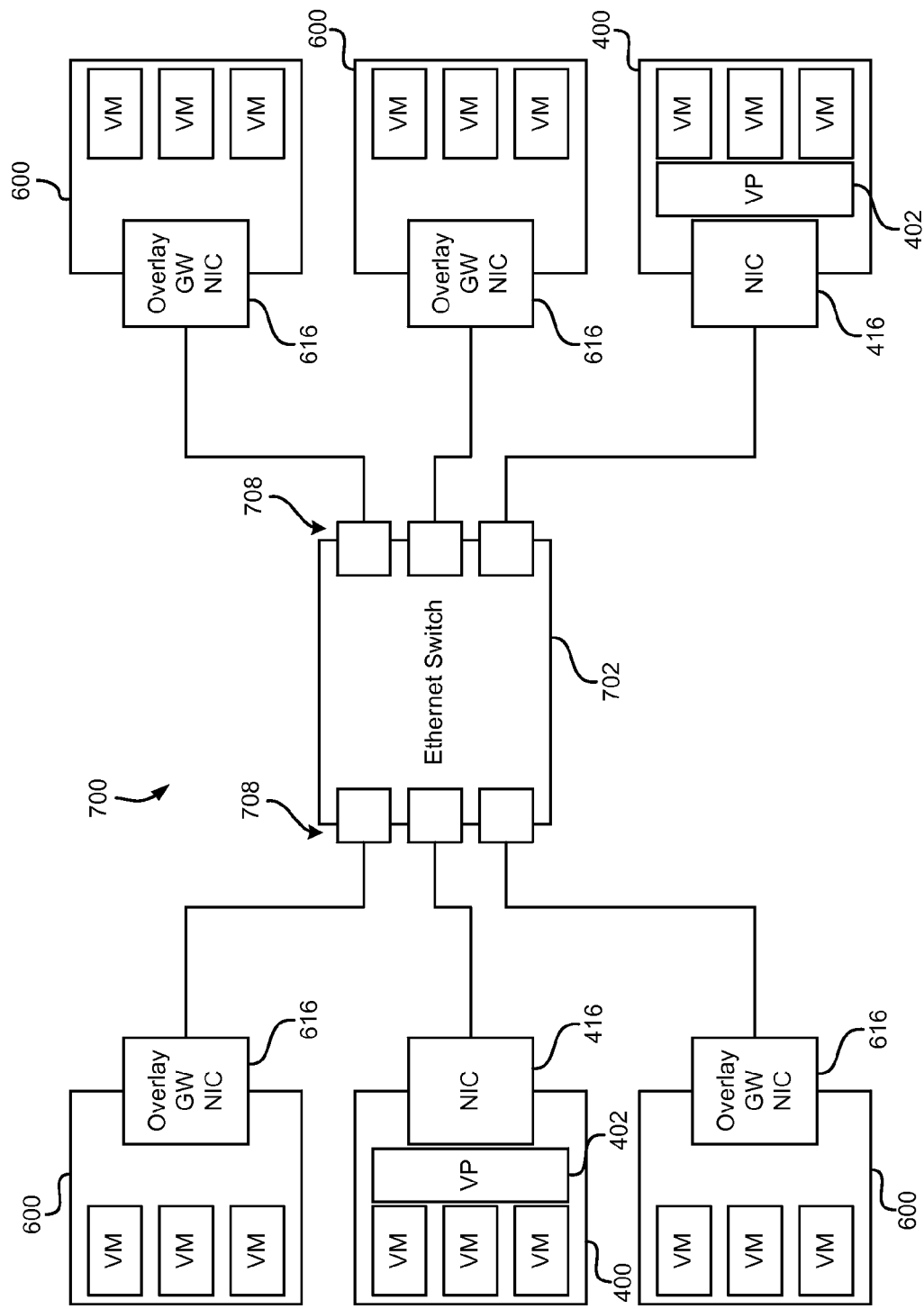
FIG. 7 shows a network including various servers with NICs, according to one embodiment.

As shown in FIG. 7, a network 700 is shown according to one embodiment. As shown, servers 400 having contemporary NICs 416 and servers 600 having overlay gateway (GW) NICs 616 may be used in the same network 700. One or more Ethernet switches 702 may be used to interconnect the servers 400, 600 or the servers 400, 600 may be connected directly to one another. Each Ethernet switch 702 includes a plurality of ports 708 for connecting thereto. The contemporary NICs 416 may operate with a virtualization platform (VP) 402 that may provide some overlay functionality.

Figure 8:
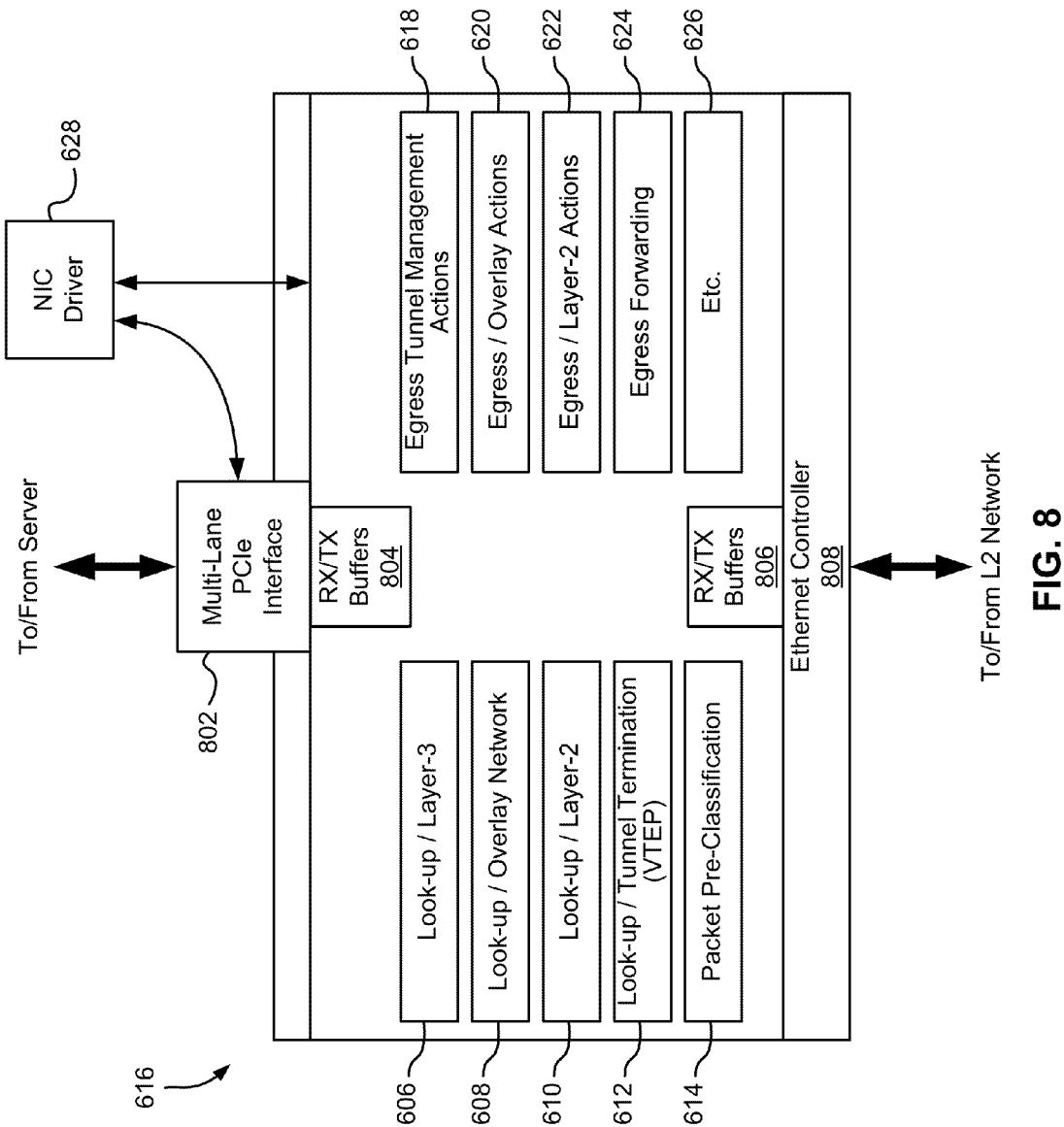
FIG. 8 shows a detailed view of a NIC having overlay gateway functionality, according to one embodiment.

Now referring to FIG. 8, a NIC 616 having overlay network gateway functionality is shown in more detail according to one embodiment. The NIC 616 comprises a multi-lane PCIe interface 802 for interfacing with a server, receiving and transmitting (RX/TX) packet buffers 804 for caching traffic to/from the server, RX/TX packet buffers 806 for caching traffic to/from a network, an Ethernet controller 808 for interacting with the network, and the various overlay network gateway functionality in the form of logic, modules, or some combination thereof. The overlay network gateway functionality may include any of the following, as separate modules or in various combinations thereof, such as performing look-ups for L3 addresses and devices 606, performing look-ups for overlay addresses and devices 608, performing look-ups for L2 addresses and devices 610, performing look-ups for tunnel addresses and devices 612, performing packet pre-classification 614, performing egress tunnel management actions (e.g., VTEP) 618, performing egress overlay actions 620, performing egress L2 actions 622, performing egress forwarding actions 624, along with possibly other packet functionality 626, and/or any other overlay network gateway functionality known in the art.

Some additional functionality may include interacting with the virtualization platform and the virtual switch and/or providing I/O virtualization.

According to various embodiments, each module 606, 608, 610, 612, etc., may be implemented by a single processor or a plurality of separate processors, each processor being capable of providing the requisite functionality. The processor(s) may include, but are not limited to, an ASIC, a FPGA, a CPU, a MC, a microprocessor, or some other processor known in the art.

In further embodiments, when each module 606, 608, 610, 612, etc., is implemented in a plurality of separate processors, each processor may be controlled and/or interfaced with using a separate NIC driver 628 (e.g., one NIC driver for each processor) or by a single NIC driver 628 interfacing with all of the plurality of separate processors, in various embodiments.

According to one embodiment, the virtualization platform may comprise logic adapted for providing overlay functionality to network traffic. In this embodiment, the NIC may comprise functionality to allow the network traffic that has overlay functionality provided by the virtualization platform to bypass the NIC.

In another embodiment, the network may not comprise elements capable of providing overlay network gateway functionality (or overlay functionality). That is to say, the only elements in the network capable of providing overlay network gateway functionality or overlay functionality may be the NICs implemented in the servers. In another approach, the server may not provide overlay functionality at all (e.g., the virtualization platform does not have overlay capability), in which case the NIC is relied upon to provide all overlay functionality. Of course, in other embodiments, there may be some combination of the NIC and other elements which are providing overlay functionality, such as an overlay gateway, a virtualization platform, etc.

Figure 9:
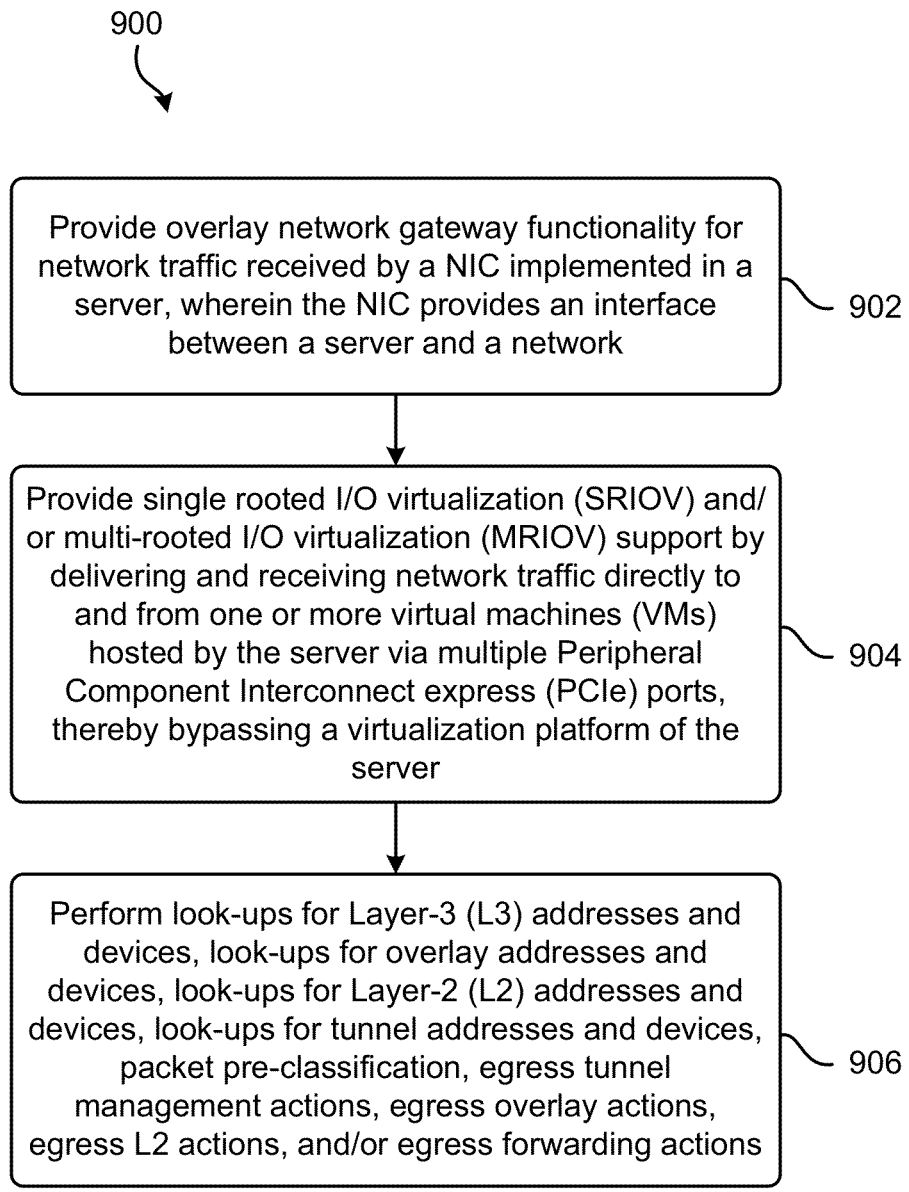
FIG. 9 is a flowchart of a method, according to one embodiment.

Now referring to FIG. 9, a method 900 for providing overlay network gateway functionality in a server is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various non-limiting embodiments, the method 900 may be partially or entirely performed by a NIC having overlay network gateway functionality, a processor (such as a CPU, an ASIC, a FPGA, etc.) which may be embedded in and/or operate within a NIC, computer program code embedded in a computer readable storage medium within a NIC, etc.

As shown in FIG. 9, method 900 may initiate with operation 902, where overlay network gateway functionality is provided for network traffic received by a NIC implemented in a server. The NIC provides an interface between the server and a network.

In optional operation 904, SRIOV and/or MRIOV support may be provided by delivering and receiving network traffic directly to and from one or more VMs hosted by the server via multiple PCIe ports, thereby bypassing a virtualization platform of the server.

In optional operation 906, look-ups for Layer-3 (L3) addresses and devices, look-ups for overlay addresses and devices, look-ups for Layer-2 (L2) addresses and devices, look-ups for tunnel addresses and devices, packet pre-classification, egress tunnel management actions, egress overlay actions, egress L2 actions, and/or egress forwarding actions may be performed. In more approaches, the virtualization platform and the virtual switch may be interacted with and/or I/O virtualization may be provided, such as SRIOV and/or MRIOV.

In a further embodiment, a NIC may perform the method 900, such as in modules, ASICs, FPGAs, MCs, and/or logic adapted for performing the method 900, in various approaches. The NIC may store the logic in a memory or a set of registers of the NIC, in one embodiment.

According to another embodiment, the method 900 may be executed from a computer program product using a processor capable of executing such computer readable program code.

In another embodiment, a computer program product for providing overlay network gateway functionality in a network may include a computer readable storage medium having computer readable program code embodied therewith. The computer readable program code may comprise some or all of: computer readable program code configured for enabling specific overlay network gateway functionality in a NIC implemented in a server that is providing overlay network gateway functionality for network traffic that passes through the server, and computer readable program code configured for managing operations of the NIC, wherein the specific overlay network gateway functionality is limited to operations for traffic that is received or sent through the NIC.

In this embodiment, the NIC may be implemented in a server and may provide overlay network gateway functionality to traffic received by and/or sent from the server.

In any of the embodiments described herein, a network may be provided overlay network functionality by simply replacing the NICs in any servers where overlay network functionality is desired, without making any other changes. This is a cost effective solution to providing overlay network functionality to an otherwise standard (non-overlay) network.

According to another embodiment, a server may comprise a virtualization platform providing one or more VMs, the virtualization platform comprising logic adapted for providing support for the one or more VMs and logic adapted for providing a virtual switch, the virtual switch being adapted for providing switching functionality across a network to network traffic received from and/or sent to the one or more VMs. The server may also comprise a NIC having a plurality of network ports including multiple PCIe ports, a multi-lane PCIe interface adapted for communicating with the server, an Ethernet controller adapted for communicating with a network, logic adapted for providing overlay network gateway functionality to network traffic received from and/or sent to the network, and logic adapted for providing overlay network functionality to network traffic received from and/or sent to the one or more VMs. The server may also comprise a NIC driver adapted for interfacing with and supporting the NIC.

In a further embodiment, the virtualization platform does not provide overlay functionality to the network traffic received from and/or sent to the one or more VMs or to the network traffic received from and/or sent to the network. In this way, the NIC is relied upon to provide all overlay functionality for the server.

According to another embodiment, the NIC may further comprise a first RX/TX packet buffer adapted for caching network traffic sent to and/or received from the network and a second RX/TX packet buffer adapted for caching network traffic received from and/or sent to the server.

Furthermore, in some approaches, the network does not comprise elements for providing overlay gateway functionality and the virtualization platform does not provide overlay functionality to the network traffic received from and/or sent to the one or more VMs. In this case, the NIC provides all overlay functionality for the server and the network, possibly in conjunction with other NICs capable of overlay network gateway functionality.

In one embodiment, the NIC driver may comprise logic adapted for enabling specific overlay network gateway functionality in the NIC and logic adapted for managing operations of the NIC, wherein the specific overlay network gateway functionality is limited to operations for network traffic that is received and/or sent through the NIC.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a network interface card (NIC), comprising:
      a plurality of network ports including multiple Peripheral Component Interconnect express (PCIe) ports;
      a multi-lane PCIe interface configured to communicate with a server;
      an Ethernet controller configured to communicate with a network;
      logic configured to provide overlay network gateway functionality to overlay network traffic that passes through the NIC; and
      logic configured to provide single rooted I/O virtualization (SRIOV) and/or multi-rooted I/O virtualization (MRIOV) support to the overlay network traffic that passes through the NIC thereby bypassing a virtualization platform, the logic to provide SRIOV and/or MRIOV support being configured to:
         deliver overlay network traffic directly to one or more virtual machines (VMs) via the multiple PCIe ports after performing ingress tunnel management actions; and
         receive network traffic directly from the one or more VMs via the multiple PCIe ports and perform egress tunnel management actions.

2. The system as recited in claim 1, further comprising the server having the virtualization platform providing the one or more VMs, the virtualization platform comprising:
   logic configured to provide support for the one or more VMs;
   logic configured to provide a virtual switch, the virtual switch being configured to provide switching functionality across the network to network traffic received from and/or sent to the one or more VMs; and
   a NIC driver configured to interface with and supporting the NIC.

3. The system as recited in claim 2, wherein the NIC further comprises:
   a first receiving/transmitting (RX/TX) packet buffer configured to cache network traffic sent to and/or received from the network; and
   a second RX/TX packet buffer configured to cache the network traffic received from and/or sent to the server.

4. The system as recited in claim 2, wherein the network does not comprise elements providing overlay network gateway functionality and the virtualization platform does not provide overlay functionality to the network traffic received from and/or sent to the server.

5. The system as recited in claim 2, wherein the NIC driver comprises:
   logic configured to enable specific overlay network gateway functionality in the NIC; and
   logic configured to manage operations of the NIC,
      wherein the specific overlay network gateway functionality is limited to operations for traffic that is received or sent through the NIC.

6. The system as recited in claim 2, wherein the NIC further comprises:
   logic configured to perform look-ups for Layer-3 (L3) addresses and devices;
   logic configured to perform look-ups for overlay addresses and devices;
   logic configured to perform look-ups for Layer-2 (L2) addresses and devices;
   logic configured to perform look-ups for tunnel addresses and devices;
   logic configured to perform packet pre-classification;
   logic configured to perform egress tunnel management actions;
   logic configured to perform egress overlay actions;
   logic configured to perform egress L2 actions;
   logic configured to interact with the virtualization platform and the virtual switch;
   logic configured to provide I/O virtualization; and
   logic configured to perform egress forwarding actions.

7. The system as recited in claim 6, wherein each logic component of the NIC is implemented in a separate processor on the NIC, each separate processor being selected from a group consisting of: an application specific integrated circuit (ASIC), a field programmable gate array (FPGA), and a microcontroller (MC).

8. The system as recited in claim 1, wherein the NIC further comprises one or more hardware processors, each processor being selected from a group consisting of: an application specific integrated circuit (ASIC), a field programmable gate array (FPGA), and a microcontroller (MC).

9. A network interface card (NIC), the NIC comprising:
   one or more hardware processors, each processor being configured to execute logic implemented in and/or readable by the processor;
   a plurality of network ports including multiple Peripheral Component Interconnect express (PCIe) ports;
   a multi-lane PCIe interface configured to communicate with a server, the server comprising one or more virtual machines (VMs);
   an Ethernet controller configured to communicate with a network;
   logic configured to provide overlay network gateway functionality to overlay network traffic that passes through the NIC; and logic configured to provide single rooted I/O virtualization (SRIOV) and/or multi-rooted I/O virtualization (MRIOV) support to the overlay network traffic that passes through the NIC thereby bypassing a virtualization platform, the logic to provide SRIOV and/or MRIOV support being configured to:
deliver overlay network traffic directly to the one or more VMs via the multiple PCIe ports after performing ingress tunnel management actions; and
receive network traffic directly from the one or more VMs via the multiple PCIe ports and perform egress tunnel management actions.

10. The NIC as recited in claim 9, further comprising:
a first receiving/transmitting (RX/TX) packet buffer configured to cache network traffic sent to and/or received from the network; and
a second RX/TX packet buffer configured to cache the network traffic received from and/or sent to the server.

11. The NIC as recited in claim 9, wherein the network does not comprise elements providing overlay network gateway functionality and the server does not provide overlay functionality.

12. The NIC as recited in claim 9, wherein each of the one or more processors is selected from a group consisting of: an application specific integrated circuit (ASIC), a field programmable gate array (FPGA), and a microcontroller (MC).

13. The NIC as recited in claim 9, further comprising:
logic configured to perform look-ups for Layer-3 (L3) addresses and devices;
logic configured to perform look-ups for overlay addresses and devices;
logic configured to perform look-ups for Layer-2 (L2) addresses and devices;
logic configured to perform look-ups for tunnel addresses and devices;
logic configured to perform packet pre-classification;
logic configured to perform egress tunnel management actions;
logic configured to perform egress overlay actions;
logic configured to perform egress L2 actions;
logic configured to interact with the virtualization platform and a virtual switch of the server;
logic configured to provide I/O virtualization; and
logic configured to perform egress forwarding actions.

14. The NIC as recited in claim 13, wherein each logic component of the NIC is implemented in a separate processor on the NIC, each separate processor being selected from a group consisting of: an application specific integrated circuit (ASIC), a field programmable gate array (FPGA), and a microcontroller (MC).

15. The NIC as recited in claim 9, further comprising logic configured to communicate with a NIC driver on the server, the NIC driver comprising:
logic configured to enable specific overlay network gateway functionality in the NIC; and
logic configured to manage operations of the NIC,
wherein the specific overlay network gateway functionality is limited to operations for traffic that is received or sent through the NIC.

16. A method for providing overlay network gateway functionality in a network, the method comprising:
providing overlay network gateway functionality for network traffic received by a network interface card (NIC) implemented in a server, wherein the NIC provides an interface between the server and the network, and wherein the providing overlay network gateway functionality for network traffic comprises:
performing look-ups for overlay addresses and devices;
performing look-ups for tunnel addresses and devices;
performing egress tunnel management actions;
performing egress overlay actions;
interacting with a virtualization platform and a virtual switch of the server; and
providing I/O virtualization.

17. The method as recited in claim 16, further comprising providing single rooted I/O virtualization (SRIOV) and/or multi-rooted I/O virtualization (MRIOV) support by delivering and receiving network traffic directly to and from one or more virtual machines (VMs) hosted by the server via multiple Peripheral Component Interconnect express (PCIe) ports, thereby bypassing a virtualization platform of the server.

18. The method as recited in claim 16, wherein the providing overlay network gateway functionality for network traffic further comprises:
performing look-ups for Layer-3 (L3) addresses and devices;
performing look-ups for Layer-2 (L2) addresses and devices;
performing packet pre-classification;
performing egress L2 actions; and
performing egress forwarding actions.

19. A computer program product for providing overlay network gateway functionality in a network, the computer program product comprising a computer readable storage medium having computer readable program code embodied therewith, the computer readable program code comprising:
computer readable program code configured to enable specific overlay network gateway functionality in a network interface card (NIC) implemented in a server that is providing overlay network gateway functionality for network traffic that passes through the server; and
computer readable program code configured to manage operations of the NIC,
wherein the specific overlay network gateway functionality is limited to operations for traffic that is received and/or sent through the NIC, and
wherein the NIC provides overlay network gateway functionality for the network traffic that passes through the server by:
performing look-ups for overlay addresses and devices;
performing look-ups for tunnel addresses and devices;
performing egress tunnel management actions;
performing egress overlay actions;
interacting with a virtualization platform and a virtual switch of the server; and
providing I/O virtualization.

20. The computer program product as recited in claim 19, wherein the NIC provides overlay functionality to only a portion of the network traffic received by and/or sent from the server.

21. A server, comprising:
a virtualization platform providing one or more virtual machines (VMs), the virtualization platform comprising:
logic configured to provide support for the one or more VMs; and
logic configured to provide a virtual switch, the virtual switch being configured to provide switching functionality across a network to network traffic received from and/or sent to the one or more VMs;
a network interface card (NIC), comprising:
a plurality of network ports including multiple Peripheral Component Interconnect express (PCIe) ports;

a multi-lane PCIe interface configured to communicate with the server;

an Ethernet controller configured to communicate with a network;

logic implemented with and/or executable by one or more hardware processors, the logic being configured to:
- provide overlay network gateway functionality to network traffic received from and/or sent to the network; and
- provide overlay network functionality to network traffic received from and/or sent to the one or more VMs; and a NIC driver configured to interface with and support the NIC.

22. The server as recited in claim 21, wherein the virtualization platform does not provide overlay functionality to the network traffic received from and/or sent to the one or more VMs or to the network traffic received from and/or sent to the network.

23. The server as recited in claim 21, wherein the NIC further comprises:
- a first receiving/transmitting (RX/TX) packet buffer configured to cache-network traffic sent to and/or received from the network; and
- a second RX/TX packet buffer configured to cache network traffic received from and/or sent to the server.

24. The server as recited in claim 21, wherein the network does not comprise elements for providing overlay gateway functionality and the virtualization platform does not provide overlay functionality to the network traffic received from and/or sent to the one or more VMs.

25. The server as recited in claim 21, wherein the NIC driver comprises:
- logic configured to enable specific overlay network gateway functionality in the NIC; and
- logic configured to manage operations of the NIC,
- wherein the specific overlay network gateway functionality is limited to operations for network traffic that is received and/or sent through the NIC.

\* \* \* \* \*